Nov. 17, 1964

G. M. ORNER 3,157,046

IMPACT TEST MACHINE

Filed June 30, 1961

GEORGE M. ORNER
*INVENTOR.*

BY David A. Rich

*ATTORNEY*

Nov. 17, 1964 G. M. ORNER 3,157,046
IMPACT TEST MACHINE
Filed June 30, 1961 2 Sheets-Sheet 2

GEORGE M. ORNER
INVENTOR.

BY David A. Rick
ATTORNEY

United States Patent Office 3,157,046
Patented Nov. 17, 1964

3,157,046
IMPACT TEST MACHINE
George M. Orner, Cochituate, Mass., assignor to Manufacturing Laboratories, Inc., Cambridge, Mass., a corporation of Massachusetts
Filed June 30, 1961, Ser. No. 120,979
5 Claims. (Cl. 73—101)

This invention relates to the art of mechanical testing. More particularly, the invention relates to apparatus for impact testing.

The development of the Charpy impact test provided the basis for an apparatus useful for impact test purposes. In the prior art, a number of machines have been disclosed for practicing the Charpy method. In general, the typical prior art machine structurally includes a pendulous member carrying an impact head. The shape of the pendulous member is generally similar to the well-known pendulum arm and bob member. The pendulum is pivotally supported about an axis of rotation in a support member attached to mechanical ground. The bob swings through an anvil which supports the test specimen. The impact head or tup attached to the bob is typically located between the axis of rotation and the free end of the bob. This position broadly corresponds with the center of percussion.

As used herein, the term "center of percussion" is defined to be ". . . identical with the center of oscillation and is the point at which the percussive action of a blow is the same as if the whole mass of the body were concentrated at that point." This definition is taken from Kent's Mechanical Engineer's Hand Book, published by John Wiley and Sons, Inc., New York City, New York, 1955, Chapter 7, page 27. The center of percussion, not the center of gravity, for example, determines the period of the pendulum.

In Patent No. 403,676 issued to W. J. Keep, May 21, 1889, an impact test machine is disclosed which broadly characterizes the environment of the present invention. Other impact test machines embodying improvements for performing Izod and Charpy Impact Tests include: 1,329,192 McAdam; 1,780,696 Amsler; 2,139,527 Sonntag; 2,359,044 MacBride; and 2,450,662 Hofmann. The present impact test machine is distinguishable over those disclosed in the above noted patents in structure and operation. In the prior art, the center of percussion occurs between the free end of the bob and the axis of rotation. In contrast, the center of percussion in the present invention occurs exterior to the free end of the bob. This permits a much more rigid pendulum structure which greatly enhances the capability of accurate measurements at low impact energy values.

Because the impact head or point of impact coincides with the center of percussion, the prior art impact heads are necessarily located above the lower extremity of the bob when it is at the bottom dead center position. As a consequence the prior art machines require an anvil which carries a test specimen well elevated above a mounting base. The rigidity of the anvil is, therefore, impaired and the tendency toward jamming is increased. In contrast, the point of impact and the center of percussion of the present pendulum coincide at a point exterior to the pendulum. This enables the use of a very low anvil, sharply increasing its rigidity. Furthermore, the tendency toward jamming of the broken specimen halves between the pendulum and the anvil is substantially eliminated.

In Patent No. 1,423,842 issued to Elmendorf, July 25, 1922, there is described a tearing tester. This device in structure has a pendulum which appears to be somewhat similar to that of the present invention. The shape of Elmendorf's pendulum is broadly that of a sector of a circle. This device measures the work done in tearing. A clamp is attached to a radial edge of the pendulum to engage a test material. The material is also engaged in a clamp rigidly attached to the vertical support member for the pendulum. The Elmendorf tester is directed to the solution of an entirely different problem from that in the present invention. Furthermore, the instant impact tester is distinguishable in that an impact head is attached to the pendulum coincident with the center of percussion. In contrast, Elmendorf's device operates independent of the center of percussion and has no impact head whatever.

In the impact test machine of the present invention, the pendulum is so shaped that the center of percussion is exterior to the radius of gyration. More particularly in the present invention, the center of percussion is exterior to the circumferential path of the pendulum. In a body moving linearly with no angular component motion, the center of percussion coincides with the center of gravity. A swinging pendulum, however, has both linear and angular motion and, hence, both linear and angular momentum. In the pendulum case, the center of percussion is distinguishable from the center of gravity. It turns out that the center of percussion is located closer to the center of rotation as the mass distribution of the pendulum approaches a straight line. Conversely, as the mass distribution of the pendulum departs from a straight line and occupies a substantial solid angle relative to the center of rotation, the center of percussion moves outwardly from the center of rotation. In an extreme case, for example, a circular disk, the center of percussion is at infinity.

It is therefore an object of the present invention to provide an improved apparatus for pendulous motion.

A further object of the invention is to provide an improved apparatus for pendulous motion which absorbs a minimum of actuation energy.

Yet another object of the invention is to provide an improved impact test apparatus.

Still another object of the invention is to provide an improved impact test apparatus for accurate measurement of energy to fracture a test specimen under impact loading.

Another object of the invention is to provide an improved impact test apparatus for the accurate measurement of low level impact fracture energies.

A further object of the invention is to provide an improved impact test apparatus that is reliable in operation.

In accordance with the invention, there is provided an apparatus for pendulous motion. The apparatus includes an axis-defining, rotary bearing support means. Pendulous means are provided which include a rotatable pendulous member pivotally coupled to the support means for rotation about the axis in a circumferential path. The center of percussion of the member is exterior to the path. Actuator means are coupled to the member and disposed coincident with the center of percussion.

In accordance with a preferred embodiment an impact test apparatus is provided. The apparatus includes a support base means and yoke-shaped anvil means mounted on and affixed to the support base means for carrying a test specimen.

Vertical post support means are coupled to the base means. Axis-defining, rotary bearing, hollow axle, support means are affixed to and extended from the vertical post means. Rotary bearing means are provided having an inner race affixed to the axle means. A disc-shaped plate is centrally supported on the bearing means for rotation about the axis. Pendulous means including a sectorial, rotatable pendulous plate member are provided. The plate member is coaxially pivotally supported on the bearing means adjacent the disc plate for rotation with the disc about the axis in a circumferential path. Adjustable clamping means are coupled to the pendulous member and the disc plate for adjusting the initial angular position of the member relative to the disc. Stop means include a slidable stop shaft extending through the vertical post. The shaft engages the disc plate for fixing an initial position. Lever means pivotally link the post at a fulcrum point and the stop shaft at an end. Release means include a slidable release shaft extending through the hollow axle and the post. The release shaft pivotally links an end of the lever means. Resilience means are supported on the release shaft. Resilience means are disposed between the post and lever means for maintaining the stop shaft in engagement with the disc plate. Motion of the release shaft in opposition to the resilience means is transmitted to the lever of the stop means to disengage the disc plate and enable the disc plate and pendulum freely to pivot about the axis. The center of percussion of the member and the disc plate are exterior to the path. An angle indicator plate means is affixed to the end of the hollow shaft. A rotatable indicator member is coaxially mounted adjacent the indicator plate for rotation about the axis. Impeller means are coupled to the pendulous member for rotating the indicator member to provide an indication of the measurement of angular displacement of the pendulous member from an initial position.

For a better understanding of the invention, together with other and further objects thereof, reference is made to the following description taken in connection with the accompanying drawings and its scope will be pointed out in the appended claims.

PRINCIPLES OF OPERATION

Figure 1:
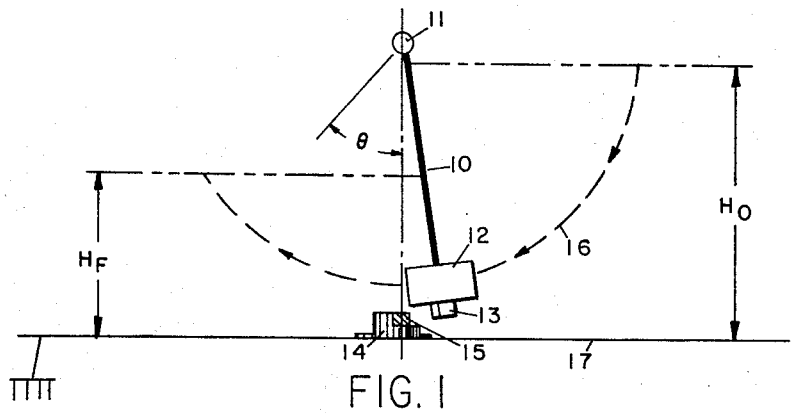
FIG. 1 is a schematic diagram illustrating an aspect of the operation of the invention.

Referring now to the drawings and with particular reference to FIG. 1, there is here illustrated a schematic diagram of an impact test device illustrating an aspect of the principles of the invention. A pendulus member 10 is shown pivotally supported about an axis of rotation 11. The pendulum bob 12 is attached to the arm of the pendulum as shown. Attached to the bob 12 is an impact head 13. The head 13 as shown differs in position from prior art machines. The bob as shown is only schematic; the pendulum shape required is described below. An anvil 14 is mounted on a support base which is attached to mechanical ground 17. A test specimen 15 is carried by the anvil.

The pendulum is rotated to an elevated initial position corresponding with $H_0$ on the diagram. The pendulum is then released and a test specimen struck at a point corresponding with, e.g., 90° of rotation from its initial position. The pendulum continues its motion to a position corresponding with the final height $H_F$. The difference between the initial height $H_0$ and the final height $H_F$ multiplied by the mass of the pendulum is a measure of the energy which is transmitted from the pendulum to the specimen in order to fracture the specimen. The angle $\theta$ measured from the vertical axis extending through the test specimen provides an indication of the angular displacement of the pendulum. The bob 12 describes a circumferential path 16 of motion.

DESCRIPTION AND EXPLANATION OF THE IMPACT TESTER IN FIGS 2-4

Figure 2:
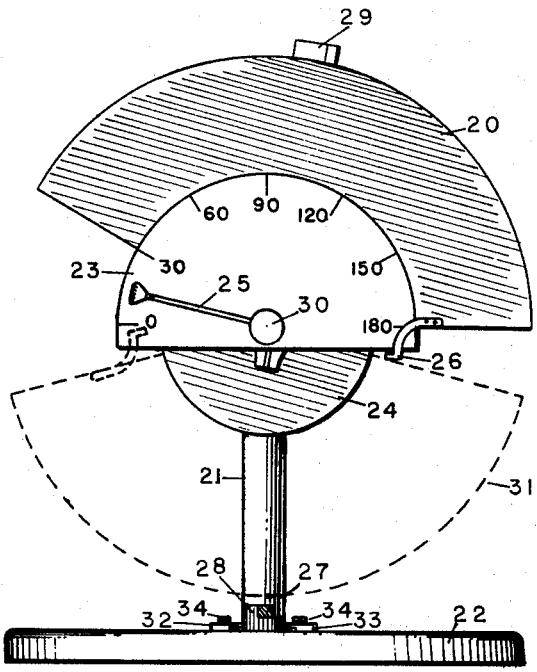
FIG. 2 is a front elevational view of an impact tester embodying the invention.
Figure 3:
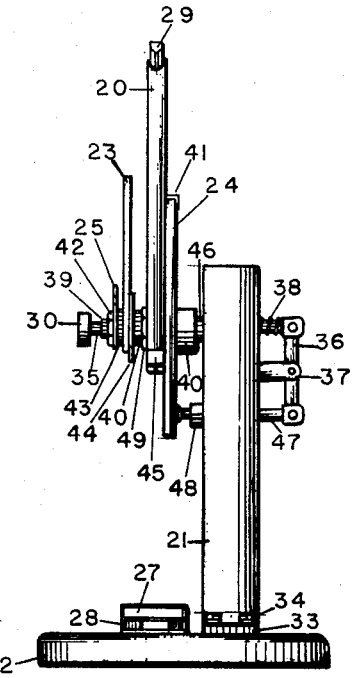
FIG. 3 is a side elevational view of the impact tester in FIG. 2.
Figure 4:
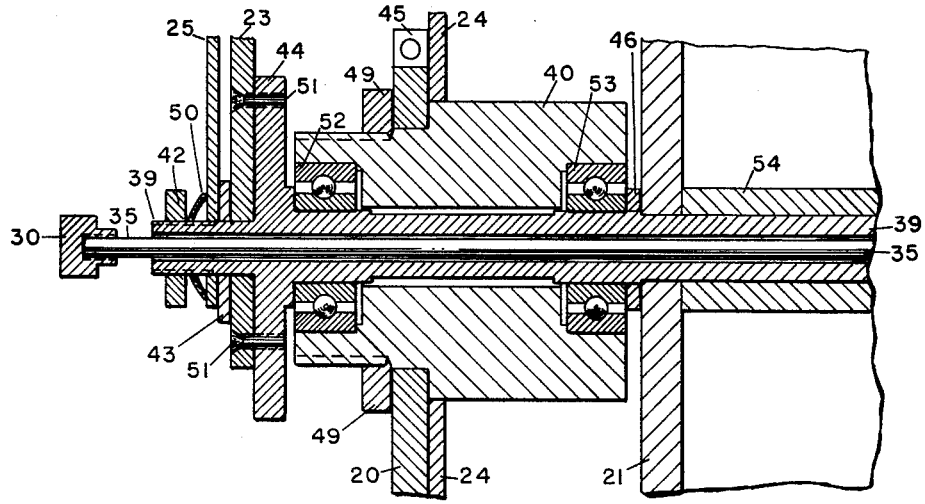
FIG. 4 is a partially fragmentary, enlarged, sectional detail view of a part of the tester in FIG. 3.

Referring now to FIGS. 2, 3, and 4, there is here illustrated a preferred embodiment of the impact tester of the invention. A pendulum formed from a plate having the shape of a sector of a circle is pivotally supported about a shaft extending through a vertical post carried by a support base. An impact head is attached to an arcuate edge of the pendulum for striking a test specimen carried by a yoke-shaped anvil mounted on the support base. A device for stopping the pendulum in an initial position and for varying its initial position is included. An angle indicator plate is mounted in fixed position in front of the pendulum. A rotatable indicator member rotates with the pendulum from the bottom dead center position.

Thus, in the FIG. 2 a pendulous member, a pendulum 20, is pivotally supported by a vertical post 21 attached to a support base 22. An angle indicator plate 23 is mounted in front of the pendulum 20. A rotatable disc plate 24 is attached to the pendulum 20. An indicator member or pointer 25 is driven by an impeller member 26 attached to the pendulum 20. A test specimen 27 is carried by an anvil 28 which is mounted on the support base 22. An impact head 29 is attached to the pendulum 20 at the radial center of the arcuate edge of the sector-shaped pendulum. A release knob 30 is coupled through the indicator plate 23 and pendulum 20 to a release mechanism. The dash lines 31 indicate in phantom the position of the pendulum 20 during its rotary motion phase. Flanges 32 and 33 extending from the post 21 are bolted to the base 22 in threaded engagement with bolts 34.

Referring now to FIG. 3 a side view of the apparatus in FIG. 2 is shown. For increased clarity the impeller member 26 is not shown in this view. The release knob 30 is attached to a slidable release shaft 35 which extends through the post 21. A lever 36 is pivotally engaged at its fulcrum point to the post 21. An end of the lever 36 is pivotally engaged to the shaft 35. The end of the lever 36 is normally under tension from the force of the spring 38.

A hollow shaft 39 is affixed to the post 21. The shaft 39 carries the inner race of a rotatable bearing housing 40 which pivotally supports the disc plate 24 and the pendulum 20. The clamp 41 adjustably affixed to the pendulum 20 clamps the disc plate 24 and the pendulum 20 together. A retainer nut 42 engages a threaded surface of the shaft 39 to clamp the member 25 in position. Between the member 25 and the plate 23 is a washer spacer 43 to provide space between the member 25 and the plate 23. The flange 44, which is integral with the hollow shaft 39, is affixed to the plate 23. A retainer nut 49 is in threaded engagement with an end of the housing 40 to clamp the pendulum in place against a shoulder of the housing 40. A spacer 46 is provided between the housing 40 and the post 21. The free end of the lever 36 is pivotally connected to a stop shaft 47 which extends through the post 21 and a bushing 48 to engage the disc plate 24. The plate 24 has an initial position hole which receives the end of the shaft 47.

Referring now to FIG. 4, the release knob 30 is affixed to the release shaft 35 which is slidably mounted in the hollow shaft 39 which provides an axis of rotation for the pendulum. The retainer nut 42 is in threaded engagement with an end of the shaft 39 and is in resilient engagement with a spring washer 50 engaging the indicator member 25. The member 25 is rotatable about the axis of shaft 39 in opposition to the spring pressure applied by the spring washer 50. The spacer washer 43 places the member 25 and indicator plate 23 in spaced relation. The plate 23 is affixed to the flange 44 by means of screws 51 in threaded engagement. A retainer nut 49 is in threaded engagement with a threaded surface of the housing 40. The retainer nut is applied against the pendulum 20 which is held in place between the nut and a shoulder of the housing 40. The pendulum is tightly mounted on the housing 40 by means of the retainer nut 49 and a clamp 45. The pendulum has an opening surrounding the housing 40 and a yoke-shaped end which is forced together with a clamping screw in the manner described below with regard to FIG. 5. The bearing housing is affixed to the outer races of a pair of ball bearings 52 and 53. The housing 40 is rotatable about the shaft 39. The inner races of the bearings 52 and 53 are affixed to the shaft 39. The spacer 46 is carried by the shaft 39 between the inner race of the bearing 53 and a side wall of the post 21. The post 21 is preferably formed of a length of pipe. The opposite wall sections of the pipe are maintained in separation by a spacer 54 which surrounds the shaft 39.

*Operation*

A test specimen 27 is placed on the anvil 28, as indicated in FIG. 2. The pendulum 20 is rotated with the disc 24 to an initial position. Release knob 30 is withdrawn. The shaft 35 moves to the left as shown in FIGS. 3 and 4 against the restraining force of the spring 38. The shaft 47 slides to the right to release the disc 24. The pendulum then rotates clockwise, as shown in FIG. 2, until the impact head 29 fractures the specimen 27. At that point the indicator impeller member 26 engages the indicator member 25. As the pendulum continues to rotate through its path, the member 25 follows until it reaches its extreme angular position. Because of the restraining force of the spring washer 50 operating as shown in FIG. 4, the member 25 remains in the extreme position when the pendulum returns in its oscillatory path. The extreme angular position of the pendulum is indicated by the position of the indicator member 25. An end of the member 25 is calibrated for vernier reading of the dial of the plate 23. The angle of deflection is interpreted to correspond with the amount of energy transferred from the pendulum to fracture the test specimen.

The indicator plate is calibrated by freely releasing the pendulum with no specimen in place. The extreme position indicated by the member 25 corresponds with the total energy available to fracture a specimen. Since this device is useful for measurement of impact energies as low as .01 foot-pound, the force of restraint provided by the member 25 is significant and is taken into account. The plate 23 is typically indicated in degrees from 0 to 180°. A typical operating zero level is 170°. Having calibrated the instrument, the angle of deflection of the pendulum 20 is noted on the angle indicator plate. The high end of the angular deflection scale corresponds with the low energies. For typical applications, an angle of 165° corresponds with .23 foot-pounds; 140° with 2.65 foot-pounds; and 120° with 5.83 foot-pounds.

The center of percussion varies with the shape of the rotatable pendulum. The center of percussion of a circular plate, for example, is at infinity. The center of percussion of a normal pendulum arm with bob is located between the lower extremity of the bob and the axis of rotation. Here a pendulum of central angle of the order of 140° is chosen to provide a center of percussion coinciding with the impact head 29 that is external to the arcuate path defined by the circumferential edge of the pendulum 20. In determining the center of percussion, the assembly of the plate 24 and the pendulum 20 must be taken into account.

The plate 24 enables the adjusting of the initial position of the pendulum 20 merely by loosening the clamp 41 as shown in FIG. 3 to rotate the pendulum relative to the disc plate 24. At the desired initial position the clamp is tightened and the apparatus is in position for operation. Because the stop shaft 47 is under resilient force provided by the spring 38 through the lever 36, the pendulum after use is merely returned to the initial position by rotating it until the stop shaft engages the hole in the plate 24.

DESCRIPTION OF PENDULUM IN FIGS. 5 AND 6

Figures 5, 6:
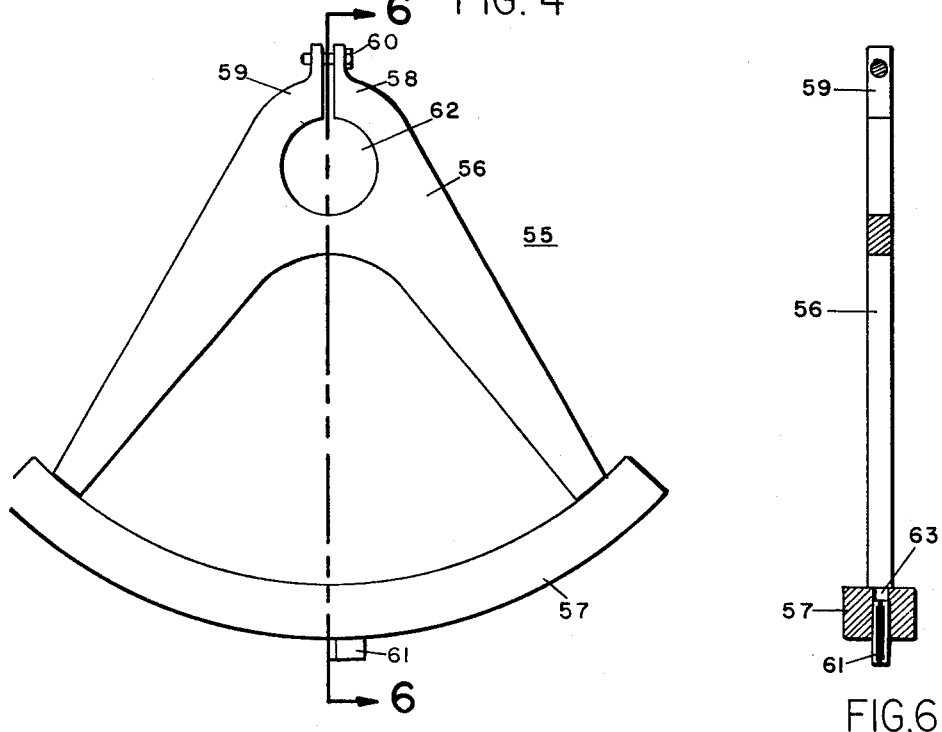
FIG. 5 is a front elevational view of a modification of the pendulum shown in FIG. 2.
FIG. 6 is a sectional view of the pendulum in FIG. 5 taken along the lines 6—6.

Referring now to FIG. 5, there is here shown a pendulum generally indicated at 55. Here the pendulum included a bifurcated support member 56 which is attached to an arcuate pendulum bob member 57. The mass of the plate of the pendulum 20 in FIG. 2 is reduced by using only the bifurcated structure shown. The arcuate member 57 is affixed to the arms of the member 56. A clamping structure is provided by the yoke assembly 58 and 59 having an opening 62 surrounding the bearing housing 40. Here a threaded hole in a clamping member 59 is engaged by means of the clamping screw 60 which extends through a clearance hole in the member 58. Drawing the members 58 and 59 together tends to clamp the pendulum on the housing 40. A similar structure is utilized for the sector-shaped pendulum in FIG. 2. The impact member 61 is attached to the member 57 at the center of percussion. The center of percussion is disposed exterior to the circumferential path defined by the arcuate edge of the member 57. As shown in FIG. 6, the impact head 61 engages a channel 63 formed in the member 57 by means, for example, of a press fit.

It will be apparent from the above description that the present invention has broad application to impact test and actuation devices.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall fairly within the true spirit and scope of the invention.

What is claimed is:
1. Impact test apparatus, comprising:
   support base means;
   yoke-shaped, anvil means mounted on and affixed to said support base means for carrying a test specimen;
   vertical post support means coupled to said base means;
   axis-defining, rotary bearing, hollow axle, support means affixed to and extending from said vertical post means;
   rotary bearing means having an inner race affixed to said axle means;
   a disc-shaped plate centrally supported on said bearing means for rotation about said axis;
   pendulous means including a sectorial, rotatable pendulous plate member coaxially pivotally supported on said bearing means adjacent said disc plate for rotation therewith about said axis in a circumferential path;
   adjustable clamping means coupling said pendulous member and said disc plate for adjusting the initial angular position of said member relative to said disc plate;
   stop means including a slidable stop shaft extending through said vertical post and engaging said disc plate for fixing an initial position;
   lever means pivotally linking said post at a fulcrum point and said stop shaft at an end;
   release means including a slidable release shaft extending through said hollow axle and said post and pivotally linking an end of said lever means;
   resilience means supported on said release shaft and disposed between said post and lever means for maintaining said stop shaft in engagement with said disc plate, whereby the motion of said release shaft in opposition to said resilience means is transmitted through said lever and stop means to disengage said disc plate and enable said disc plate and pendulum freely to pivot about said axis, said member and said disc plate having a center of percussion exterior to said path;

an angle indicator plate means affixed to an end of said hollow shaft;

a rotatable indicator member coaxially, resiliently mounted adjacent said indicator plate for rotation about said axis; and impeller means coupled to said pendulous member for rotating said indicator member to provide an indication of the maximum angular displacement of said pendulous member from an initial position.

2. Impact test apparatus, comprising:

support base means;

anvil means mounted on and affixed to said support base means for carrying a test specimen;

vertical post support means coupled to said base means;

axis defining, rotary bearing support means affixed to said vertical means;

pendulous means carried by said support means and including a sectorial, rotatable pendulous member having a circle-defining circumferential edge for rotation about said axis within said circle, said pendulous member having a center of percussion exterior to said circle and said pendulous member, the circumference of said circle being above said test specimen; and an impact element extending from said member exterior to said circumferential edge and disposed coincident with said center of percussion, whereby free rotation of said pendulous member from a selected position causes said impact element to strike a specimen in said anvil means, the continuing angular displacement of said pendulous member beyond said test specimen providing thereby an indication of the energy required to break said specimen, said impact element consisting of a mass, with a striking edge, which is small relative to said pendulous means whereby said mass has substantially no effect on the position of said center of percussion and said mass being so shaped that an extreme exterior point of said striking edge provides an extremity for said pendulous member, the entire mass of said pendulous means and said impact element being within a circle described by said extreme exterior point of said striking edge of said impact element when said pendulous member is in motion.

3. Impact test apparatus, comprising:

support base means;

anvil means mounted on and affixed to said support base means for carrying a test specimen;

vertical post support means coupled to said base means;

axis defining, rotary bearing support means affixed to said vertical means;

pendulous means carried by said support means and including a sectorial, rotatable pendulous plate member having a circle-defining circumferential edge for rotation about said axis within said circle, said pendulous member having a center of percussion exterior to said circle and said pendulous member, the circumference of said circle being above said test specimen; and an impact element extending from said plate member exterior to said circumferential edge and disposed coincident with said center of percussion, whereby free rotation of said pendulous member from a selected position causes said impact element to strike a specimen in said anvil means, the continuing anugular displacement of said pendulous member beyond said test specimen providing thereby an indication of the energy required to break said specimen, said impact element consisting of a mass, with a striking edge, which is small relative to said pendulous means whereby said mass has substantially no effect on the position of said center of percussion and said mass being so shaped that an extreme exterior point of said striking edge provides an extremity for said pendulous member, the entire mass of said pendulous means and said impact element being within a circle described by said extreme exterior point of said striking edge of said impact element when said penduous member is in motion.

4. Impact test apparatus, comprising:

support base means;

anvil means mounted on and affixed to said support base means for carrying a test specimen;

vertical post support means coupled to said base means;

axis defining, rotary bearing support means affixed to said vertical means;

pendulous means carried by said support means and including a sectorial, rotatable pendulous member having a circle-defining circumferential edge for rotation about said axis within said circle, said pendulous member having a center of percussion exterior to said circle and said pendulous member, the circumference of said circle being above said test specimen, said member having a plurality of radial arms connected to an arcuate element having said circumferential edge; and an impact element extending from said arcuate element exterior to said circumferential edge and disposed coincident with said center of percussion, whereby free rotation of said pendulous member from a selected position causes said impact element to strike a specimen in said anvil means, the continuing angular displacement of said pendulous member beyond said test specimen providing thereby an indication of the energy required to break said specimen, said impact element consisting of a mass, with a striking edge, which is small relative to said pendulous means whereby said mass has substantially no effect on the position of said center of percussion and said mass being so shaped that an extreme exterior point of said striking edge provides an extremity for said pendulous member, the entire mass of said pendulous means and said impact element being within a circle described by said extreme exterior point of said striking edge of said impact element when said pendulous member is in motion.

5. Impact test apparatus, comprising:

support base means;

anvil means mounted on and affixed to said support base means for carrying a test specimen;

vertical post support means coupled to said base means;

axis defining, rotary bearing support means affixed to said vertical means;

pendulous means carried by said support means and including a sectorial, rotatable pendulous member having a circle-defining circumferential edge for rotation about said axis within said circle, said pendulous member having a center of percussion exterior to said circle and said pendulous member, the circumference of said circle being above said test specimen;

a disc-shaped plate coupled to said pendulous means for rotation therewith, said plate being carried by said support means for rotation about said axis; and an impact element extending from said member exterior to said circumferential edge and disposed coincident with said center of percussion, whereby free rotation of said pendulous member from a selected position causes said impact element to strike a specimen in said anvil means, the continuing angular displacement of said pendulous member beyond said test specimen providing thereby an indication of the energy required to break said specimen, said impact element consisting of a mass, with a striking edge, which is small relative to said pendulous means whereby said mass has substantially no effect on the position of said center of percussion and said mass being so shaped that an extreme exterior point of said striking edge provides an extremity for said pendulous member, the entire mass of said pendulous means and said impact element being within a circle described by said extreme exterior point of said striking edge of said impact element when said pendulous member is in motion.

References Cited in the file of this patent

UNITED STATES PATENTS

| 2,051,464 | Bradner et al. | Aug. 18, 1936 |
| 2,139,527 | Sonntag | Dec. 6, 1938 |
| 2,450,662 | Hofmann | Oct. 5, 1948 |

FOREIGN PATENTS

| 376,726 | Great Britain | 1932 |